(12) United States Patent
Lin et al.

(10) Patent No.: US 9,205,323 B2
(45) Date of Patent: Dec. 8, 2015

(54) LOCALIZATION SYSTEM FOR MOUNTING GAME IN PORTABLE STORAGE DEVICE ON GAME CONSOLE AND METHOD THEREFOR

(71) Applicants: Pao-Chen Lin, New Taipei (TW); Hung-Chun Tseng, Yunlin County (TW)

(72) Inventors: Pao-Chen Lin, New Taipei (TW); Hung-Chun Tseng, Yunlin County (TW)

(73) Assignee: Pao-Chen Lin, Zhudong Township, Hsinchu County (TW)

( * ) Notice: Subject to any disclaimer, the term of this patent is extended or adjusted under 35 U.S.C. 154(b) by 161 days.

(21) Appl. No.: 13/684,177

(22) Filed: Nov. 22, 2012

(65) Prior Publication Data
US 2013/0084996 A1   Apr. 4, 2013

Related U.S. Application Data

(63) Continuation-in-part of application No. 12/010,222, filed on Jan. 22, 2008, now abandoned.

(51) Int. Cl.
| | |
|---|---|
| *A63F 13/00* | (2014.01) |
| *A63F 9/24* | (2006.01) |
| *A63F 13/98* | (2014.01) |
| *A63F 13/90* | (2014.01) |
| *A63F 13/40* | (2014.01) |

(52) U.S. Cl.
CPC . *A63F 9/24* (2013.01); *A63F 13/02* (2013.01); *A63F 13/08* (2013.01); *A63F 13/10* (2013.01); *A63F 2300/206* (2013.01); *A63F 2300/207* (2013.01); *A63F 2300/209* (2013.01)

(58) Field of Classification Search
CPC .......................................................... G07F 17/32
USPC .................................................. 463/16, 17, 18
See application file for complete search history.

(56) References Cited

U.S. PATENT DOCUMENTS

| | | | |
|---|---|---|---|
| 2009/0115900 A1* | 5/2009 | Dai et al. | 348/554 |
| 2013/0029745 A1* | 1/2013 | Kelly et al. | 463/19 |

* cited by examiner

*Primary Examiner* — Reginald Renwick
(74) *Attorney, Agent, or Firm* — Winston Hsu; Scott Margo

(57) ABSTRACT

A localization system for mounting a game, in a portable storage device, on a game console, includes a portable storage device and a game console. After the game console is connected with the portable storage device via an application-program menu in the game console, a target and game information in a header is searched for. Next, a step of checking if any cover information or setup-file information has correspondence to a correspondence code in the header, wherein in the case of YES, cover information or setup-file information are returned to the application-program menu and displayed on a screen. Next, a game can be performed to read a game file, including a game main program, in the portable storage device.

15 Claims, 12 Drawing Sheets

LOCALIZATION SYSTEM FOR MOUNTING GAME IN PORTABLE STORAGE DEVICE ON GAME CONSOLE AND METHOD THEREFOR

CROSS-REFERENCE TO RELATED APPLICATION

This application is a continuation-in-part of the co-pending patent application Ser. No. 12/010,222, owned by the same applicant.

a) FIELD OF THE DISCLOSURE

The invention relates to a localization technology of mounting a game, in a portable storage device, on a game console, and more particularly, to a localization system for mounting a game, in a portable storage device, on a game console and a method therefor, capable of promptly mounting a game program on the game console without installing any game and of saving time of files transmitted to an internal hard disk.

b) BRIEF DESCRIPTION OF THE RELATED ART

Every household can be said to hold at least one game console for family entertainment. Game consoles on the market have various kinds, such as XBOX, XBOX 360, PS2, PS3, WII, N64 and so on. Two ways to perform a game for the game consoles include (1) performing it via an internal hard disk storing a large number of games or (2) performing it via an optical disk or cassette.

However, the game consoles when being used have the following problems:

With regards to current software, the development speeds of file sizes and numbers are extremely greater than those of a hard-disk space and interface. Further, a game in a portable storage device, such as flash disk, is read into a hard disk in a game console, and then the game can be performed. In the case that there are hundreds or thousands of games in the portable storage device, much time must be spent for reading the game. Besides, the game console could be down because a game main program has a size in GB as a unit, and even greater than 10 GB. Undoubtedly, a lot of time is wasted and the above method is not practical. The hard disk in the game console has limited capacity, and thus cannot load more games. Besides, due to containing a hard disk, a traditional game console becomes bulky with occupied internal space, is not easily carried and has a cost issue.

Accordingly, the invention is proposed to achieve objectives to solve the above disadvantages.

SUMMARY OF THE DISCLOSURE

According to the above disadvantages, the inventors had long experience in this field and straight did researches and tests, and finally the invention can be developed to a localization system for mounting a game, in a portable storage device, on a game console and a method therefor, capable of promptly mounting a game program on the game console without installing any game and of saving time of files transmitted to an internal hard disk.

The present invention is provided to achieve an objective of promptly mounting a game using a nonsynchronous localization technology to simulate a portable storage device as an internal hard disk in a game console. Thereby, effectiveness can be enhanced. The game console has a reduced volume and can have a game promptly mounted thereon without any hard disk.

In order to achieve the objective of the present invention, a game console and a portable storage device informationally connected with the game console are provided. The portable storage device comprises a target, i.e. targeted word unit, informationally connected with a header, i.e. small database having a correspondence code, capable of reading a logical configuration unit containing at least a game image file, wherein the game image file has a correspondence code corresponding to the correspondence code in the header and thus can be precisely read by the small database, i.e. header. The game console is informationally connected with the portable storage device through at least an interface informationally connected with a storage unit. The storage unit has an application program that can be run to read the corresponding code, having correspondence to the game image file, in the small database, i.e. header, to perform a display function and lead the game image file to be loaded in a free space in a main memory. When a user uses a controller to click on a game to be performed, with the processing of a central processing unit (CPU), the game image file is loaded in the free space in the main memory and the game is performed. A method for the game console reading the portable storage device comprises first a user connecting the portable storage device with the game console; next starting an application-program menu on a screen; running the application program to determine if the portable storage device is found or completely connected via the interface (in the embodiment, the portable storage device is determined to be found); searching for the targeted word unit, i.e. target, in the portable storage device and game information in the small database, i.e. header, in response to the game console finding the portable storage device; next checking if any cover information or setup-file information has correspondence to the correspondence code in the small database, i.e. header; for example, in the case that game information corresponding to the correspondence code 01 in the small database, i.e. header, is to be obtained, the small database, i.e. header, can verify by comparison the cover information or setup-file information having correspondence to the correspondence code 01 in the header to be read; and next returning the read information to the application-program menu, loading the read information in the free space in the main memory and displaying the read information on the screen. Thereby, the technology of the game console reading the portable storage device is complete. Afterwards, when the user uses the controller to click on a game in the application-program menu, with the processing of the central processing unit (CPU), the game console can directly read the game image file of the code number 01 to be loaded in the free space in the main memory and perform the game. Thereby, the technology of promptly mounting and localizing a game is completed.

Accordingly, the above technology can solve that the traditional game console, only after reading all games, stored in the portable storage device, one by one to be saved in a hard disk in the game console, can perform a game. The traditional game console is time consuming and the hard disk in the traditional game console has capacity that is easily filled up such that no more game can be stored in the hard disk. The above technology can solve the traditional game console, due to containing the hard disk, having a volume that cannot be reduced. Internal space is led to be occupied and the traditional game console is led not to be easily carried and to have a cost issue. The present invention can break through these traditional problems.

The accompanying drawings are included to provide a further understanding of the invention, and are incorporated as a part of this specification. The drawings illustrate embodiments of the invention and, together with the description, serve to explain the principles of the invention.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

Figure 1:
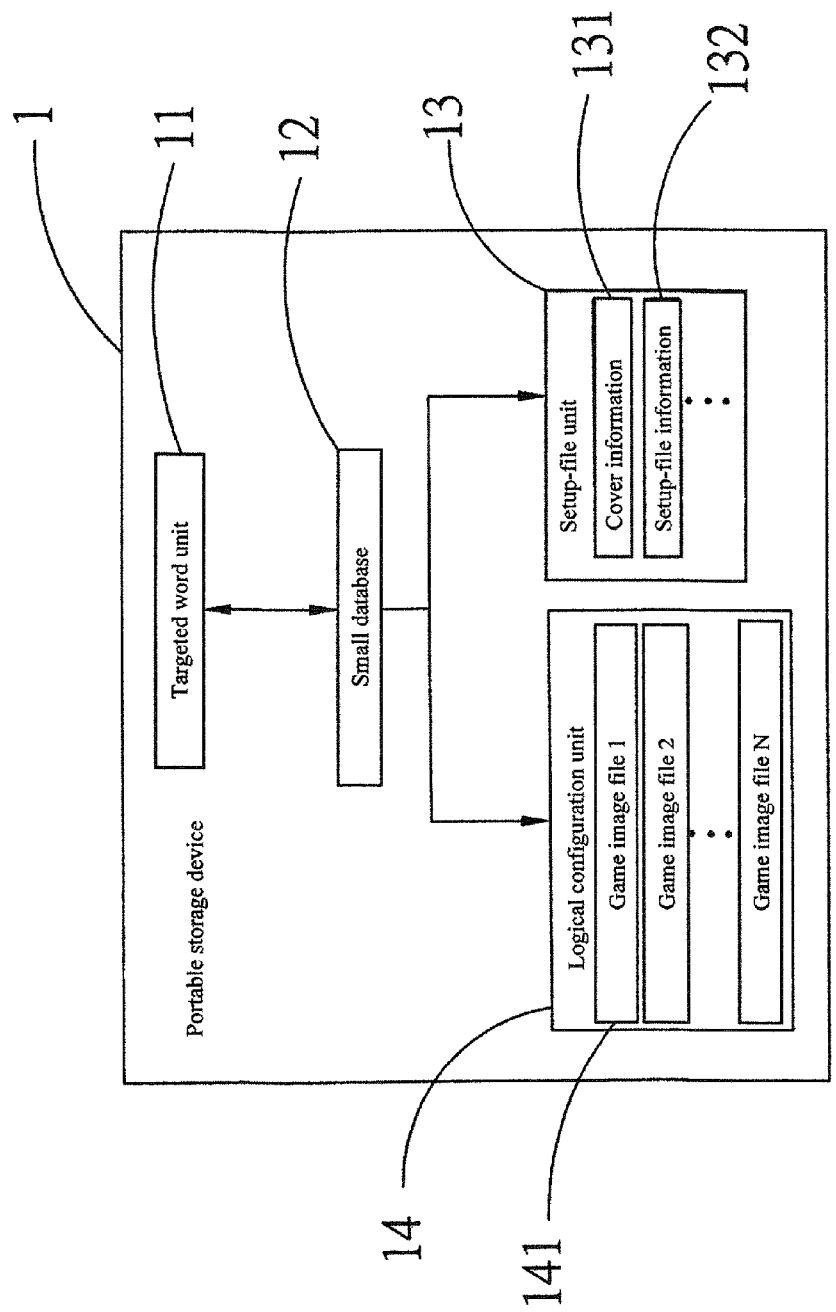
FIG. 1 is a block view of a portable storage device in accordance with the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

Figure 2:
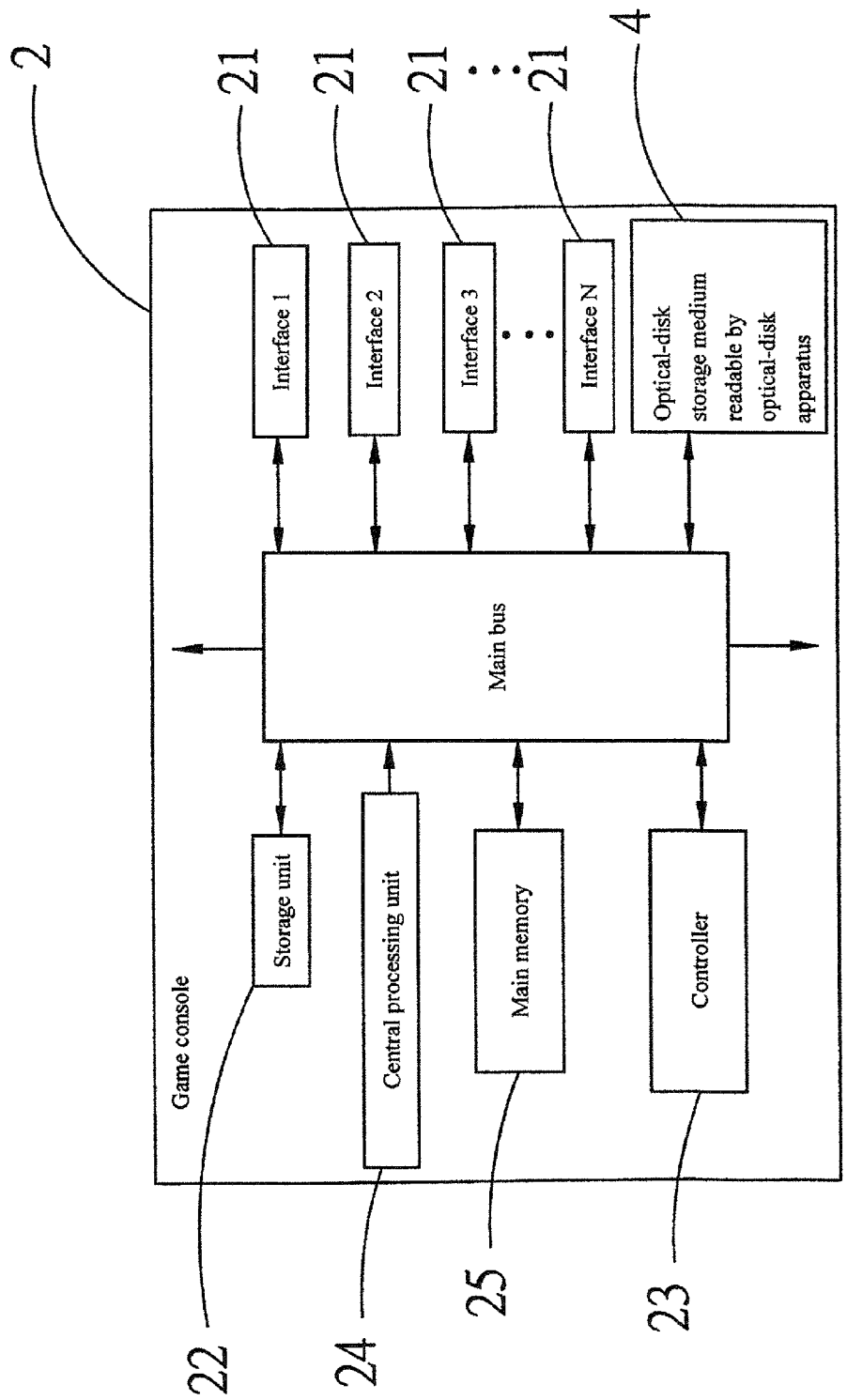
FIG. 2 is a block view of a game console in accordance with the present invention.

FIG. 1 is a block view of a portable storage device in accordance with the present invention. FIG. 2 is a block view of a game console in accordance with the present invention.

Referring to FIGS. 1 and 2, in accordance with the present invention, a portable storage device 1, such as MMC card, SD card, MINI card, MD card, FLASH memory, hard disk or any type of portable storage device for storing game files includes a targeted word unit 11, i.e. target, informationally connected with a small database 12, i.e. header, having a correspondence code. The small database 12 is informationally connected with a setup-file unit 13 including cover information 131 or setup-file information 132. A logical configuration unit 14 containing at least a game image file 141 can be read by the small database 12. The game image file 141 has a correspondence code corresponding to the correspondence code in the header and thus can be precisely read by the small database 12, wherein the game image file 141 includes a game corresponding code, game name, game program and game video file.

A game console 2, such as computer, XBOX, XBOX 360, PS 2, PS3, WII, N64 or any type of game console connectable to a television, includes an interface 21, such as USB port, RS-454 port, IEEE1394 port, SATA port, for informationally connecting with the portable storage device 1. Information can be downloaded or downloaded to overwrite an original file via the interface 21 informationally connected with a storage unit 22. The storage unit 22 has an application program that can be run to read the corresponding code, having correspondence to the game image file 141, in the small database 12, i.e. header, to perform a display function. When a user uses a controller 23 to click on a game to be performed, by the processing of a central processing unit 24 (CPU), the game image file 141 is loaded in a free space in a main memory 25 and the game is performed. The interface 21 can be informationally connected with at least a preset server 3 and the application program can be run to verify if game information in the small database 12 is normal in comparison with that in a game database in the server 3. Next, information can be optionally downloaded or downloaded to overwrite an original file.

The game console 2 may further comprise an optical-disk storage medium 4 readable by an optical-disk apparatus, wherein in the optical-disk storage medium 4 is at least a game file. The optical-disk apparatus can read the optical-disk storage medium 4 to write the game file into the logical configuration unit 14. When the user clicks to install or perform a game via related functions of an application-program menu, the optical-disk storage medium 4 is read by the optical-disk apparatus and has the game file therein to be written into the logical configuration unit 14 such that a cover picture or game setup file is transmitted to a cover folder or setup-file folder in the setup-file unit and game information can be set up in the small database 12 for being promptly performed.

Figure 3:
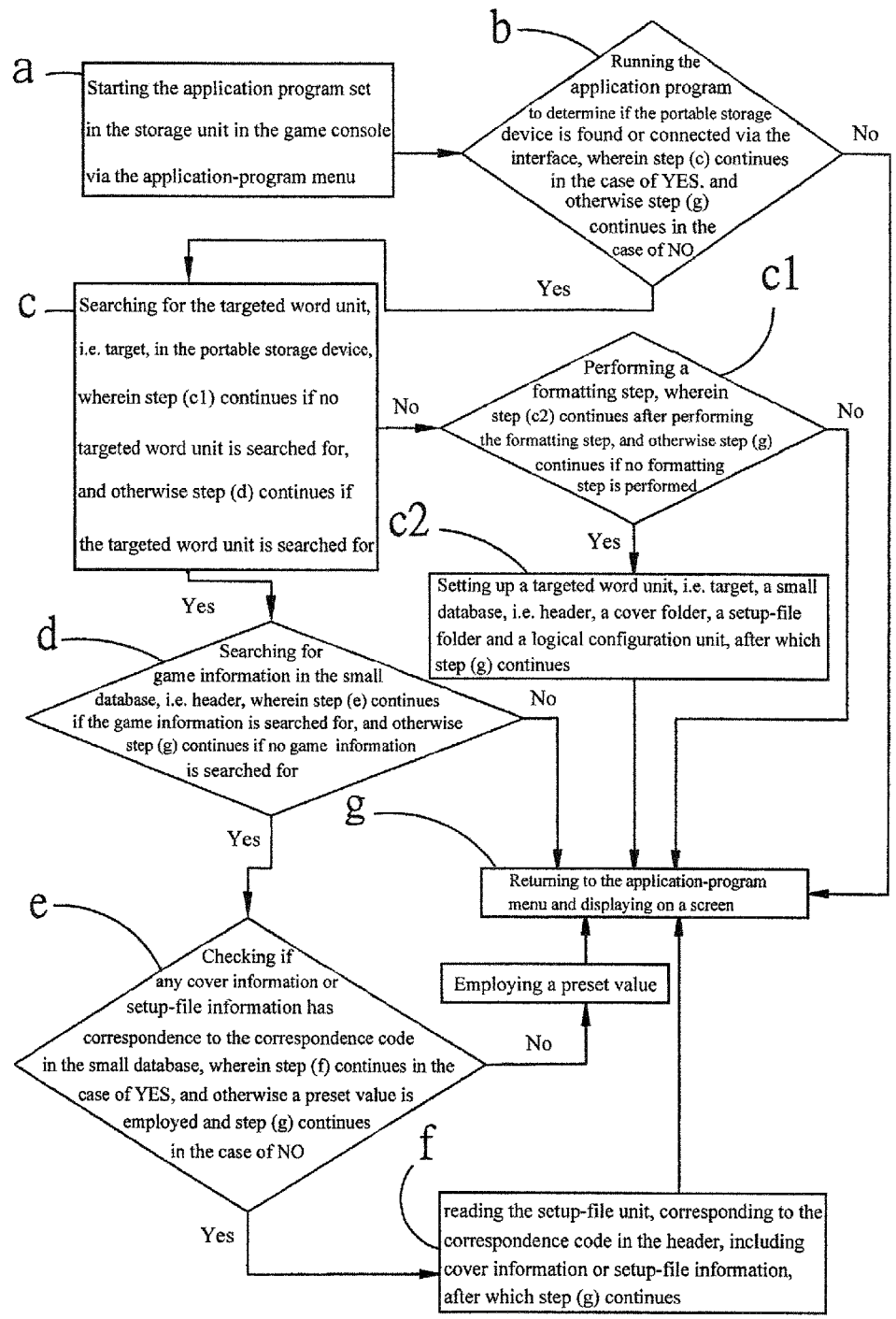
FIG. 3 is a flow chart of a method for the game console reading information of the portable storage device in accordance with the present invention.
Figure 3A:
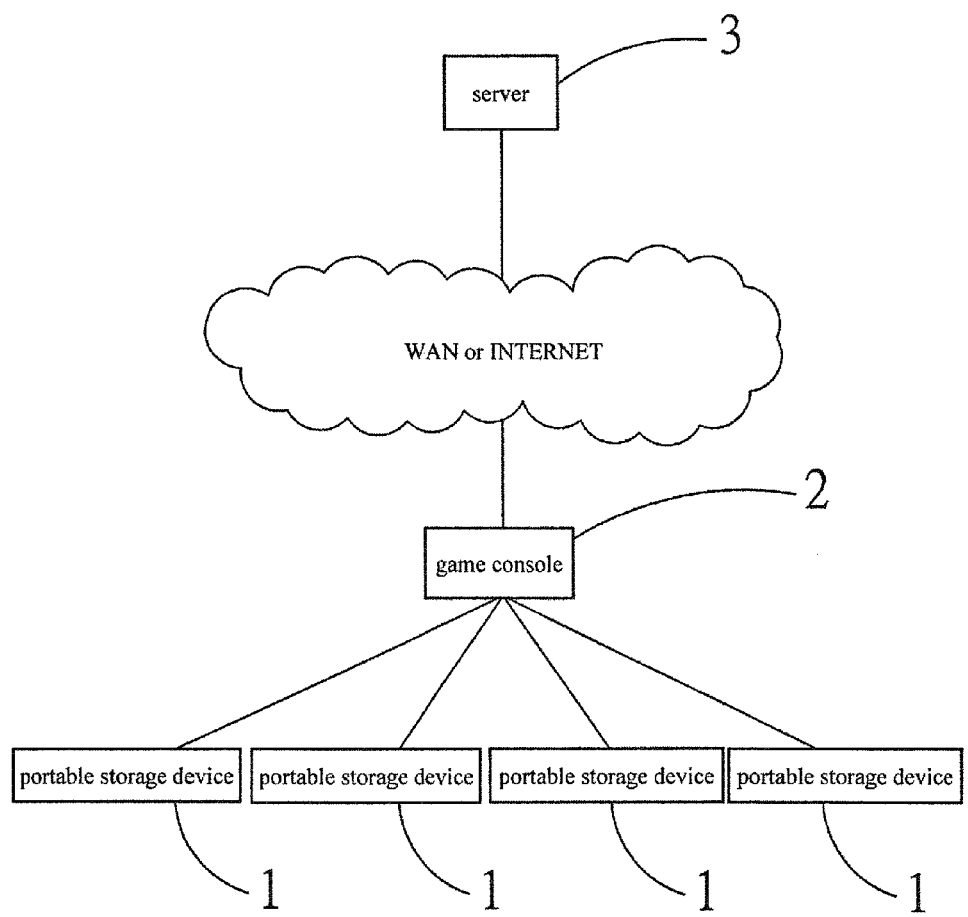
FIG. 3A is a schematic view in accordance with an embodiment of the present invention.
Figure 3B:
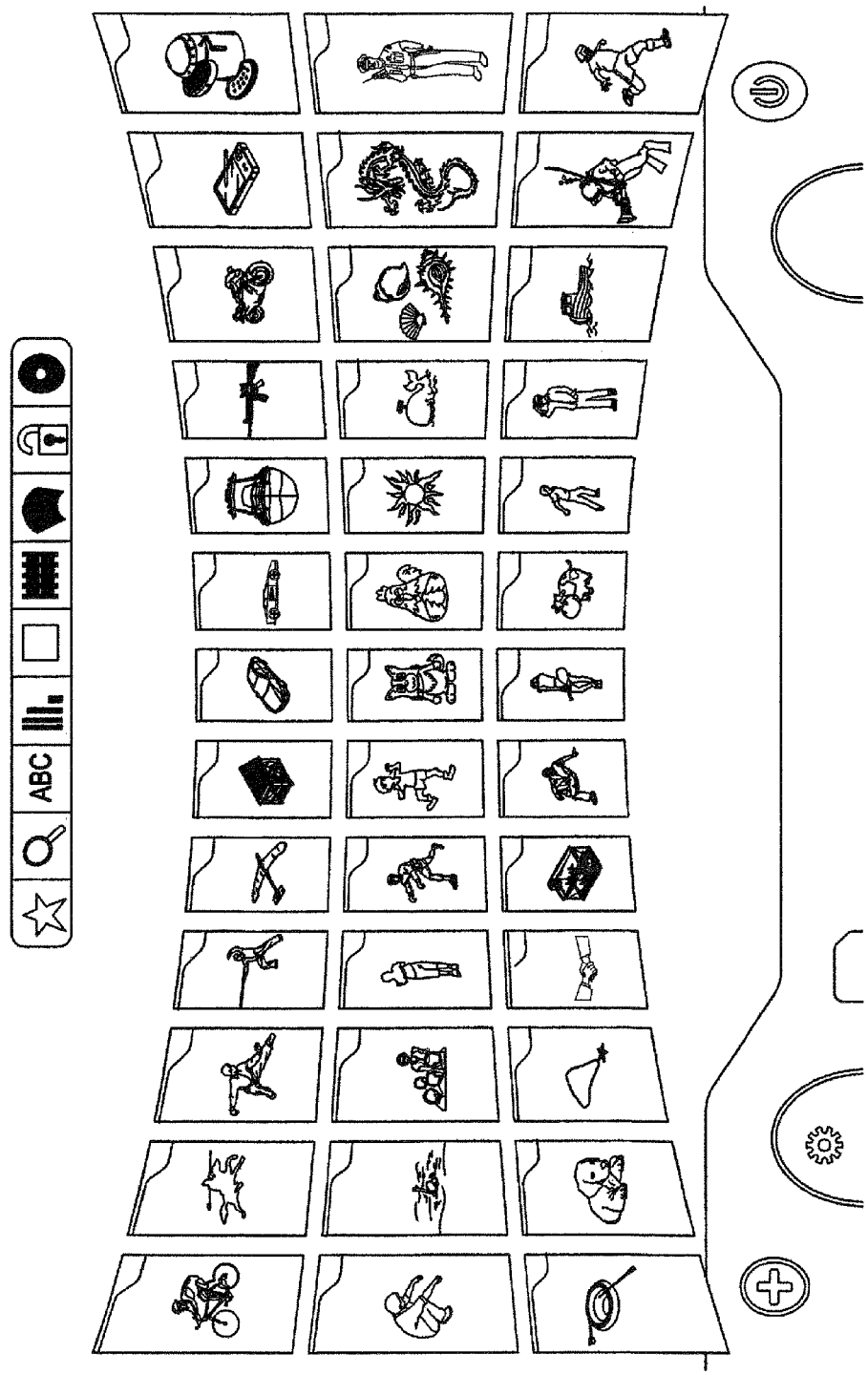
FIG. 3B is a schematic view of an application-program menu in accordance with the present invention.

FIG. 1 is a block view of a portable storage device in accordance with the present invention. FIG. 2 is a block view of a game console in accordance with the present invention. FIG. 3 is a flow chart of a method for the game console reading information of the portable storage device in accordance with the present invention. FIG. 3A is a schematic view in accordance with an embodiment of the present invention. FIG. 3B is a schematic view of an application-program menu in accordance with the present invention. Referring to FIG. 1 through FIG. 3B, the game console uses the following steps to read information in the portable storage device:

(a) starting the application program set in the storage unit in the game console via the application-program menu;
(b) running the application program to determine if the portable storage device is found or connected via the interface, wherein step (c) continues in the case of YES, and otherwise step (g) continues in the case of NO;
(c) searching for the targeted word unit, i.e. target, in the portable storage device, wherein step (c1) continues if no targeted word unit is searched for, and otherwise step (d) continues if the targeted word unit is searched for;
(c1) performing a formatting step, wherein step (c2) continues after performing the formatting step, and otherwise step (g) continues if no formatting step is performed;
(c2) setting up a targeted word unit, i.e. target, a small database, i.e. header, a cover folder, a setup-file folder and a logical configuration unit, after which step (g) continues;
(d) searching for game information in the small database, i.e. header, wherein step (e) continues if the game information is searched for, and otherwise step (g) continues if no game information is searched for;
(e) checking if any cover information or setup-file information has correspondence to the correspondence code in the small database, i.e. header, wherein step (f) continues in the case of YES, and otherwise a preset value is employed and step (g) continues in the case of NO;
(f) reading the setup-file unit, corresponding to the correspondence code in the header, including cover information or setup-file information, after which step (g) continues;
(g) returning to the application-program menu and displaying on a screen.

The above steps are described for more elaboration, as below:
(a) a user connecting the portable storage device with the game console, and then starting the application program in the game console via the application-program menu, as shown in FIG. 3B, on the screen;
(b) running the application program to determine if the portable storage device is found or connected via the interface, wherein step (c) continues if the portable storage device is determined to be found, and otherwise step (g) continues if the portable storage device is determined not to be found;
(c) searching for the targeted word unit, i.e. target, in the portable storage device when the portable storage device is determined to be found, wherein step (c1) continues if no targeted word unit is searched for, and otherwise step (d) continues if the targeted word unit is searched for;
(c1) performing a formatting step if no targeted word unit is searched for, wherein step (c2) continues after performing the formatting step, and otherwise step (g) continues if no formatting step is performed;
(c2) setting up a targeted word unit, i.e. target, a small database, i.e. header, a cover folder, a setup-file folder and a logical configuration unit in the portable storage device, after which step (g) continues, followed by steps (c)-(d) continuing;
(d) searching for the game information in the small database, i.e. header, wherein step (e) continues if the game information is searched for, and otherwise step (g) continues if no game information is searched for;
(e) checking if any cover information or setup-file information has correspondence to the correspondence code in the small database, i.e. header, wherein step (f) continues in the case of YES, and otherwise a preset value is employed and step (g) continues in the case of NO; for example, in the case that game information corresponding to the correspondence code 01 in the small database, i.e. header, is to be obtained, the small database, i.e. header, can verify by comparison the cover information or setup-file information having correspondence to the correspondence code 01 in the header to be read;
(f) reading the setup-file unit, corresponding to the correspondence code in the header, including cover information or setup-file information, after which step (g) continues;
(g) returning to the application-program menu and displaying on the screen.

Figure 4:
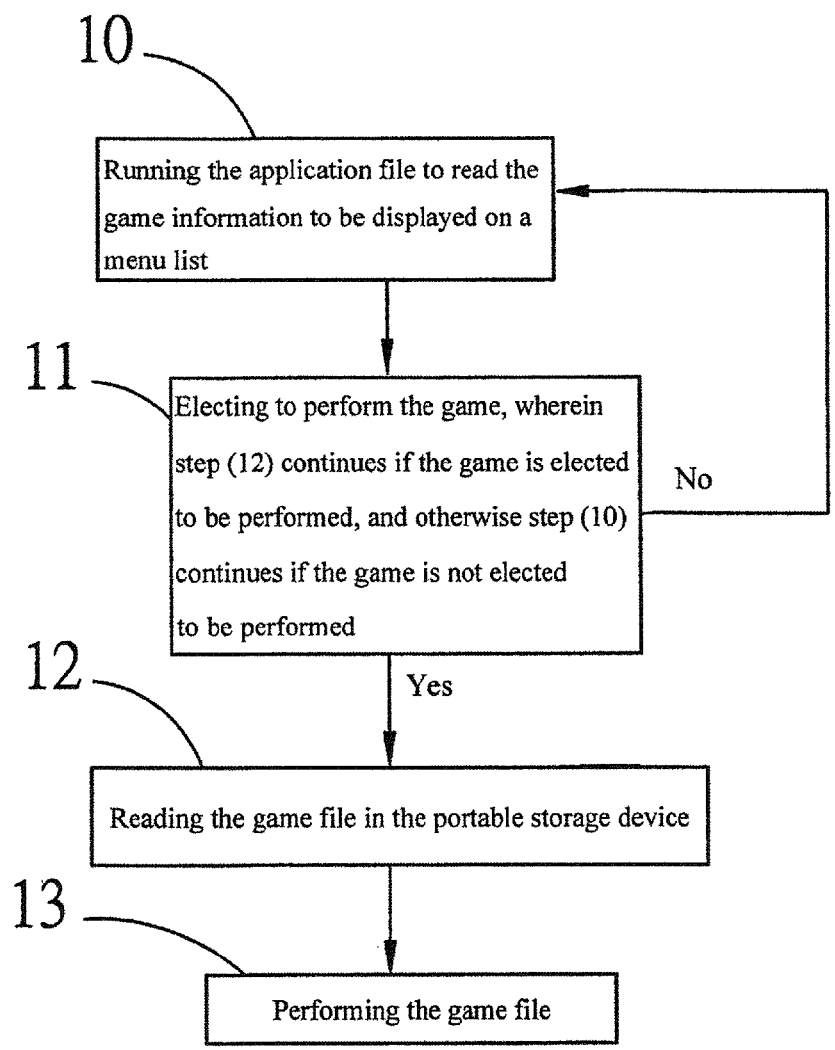
FIG. 4 is a block flow chart of performing a game program in accordance with the present invention.

FIG. 4 is a block flow chart of performing a game program in accordance with the present invention. Referring to FIG. 2, after the game console reads the cover information and setup-file information of the portable storage device, a user can select a game to be performed via a screen, mentioned as the following steps:
(10) running the application file to read the game information to be displayed on a menu list;
(11) electing to perform the game, wherein step (12) continues if the game is elected to be performed, and otherwise step (10) continues if the game is not elected to be performed;
(12) reading the game file in the portable storage device;
(13) performing the game file.

Figure 5:
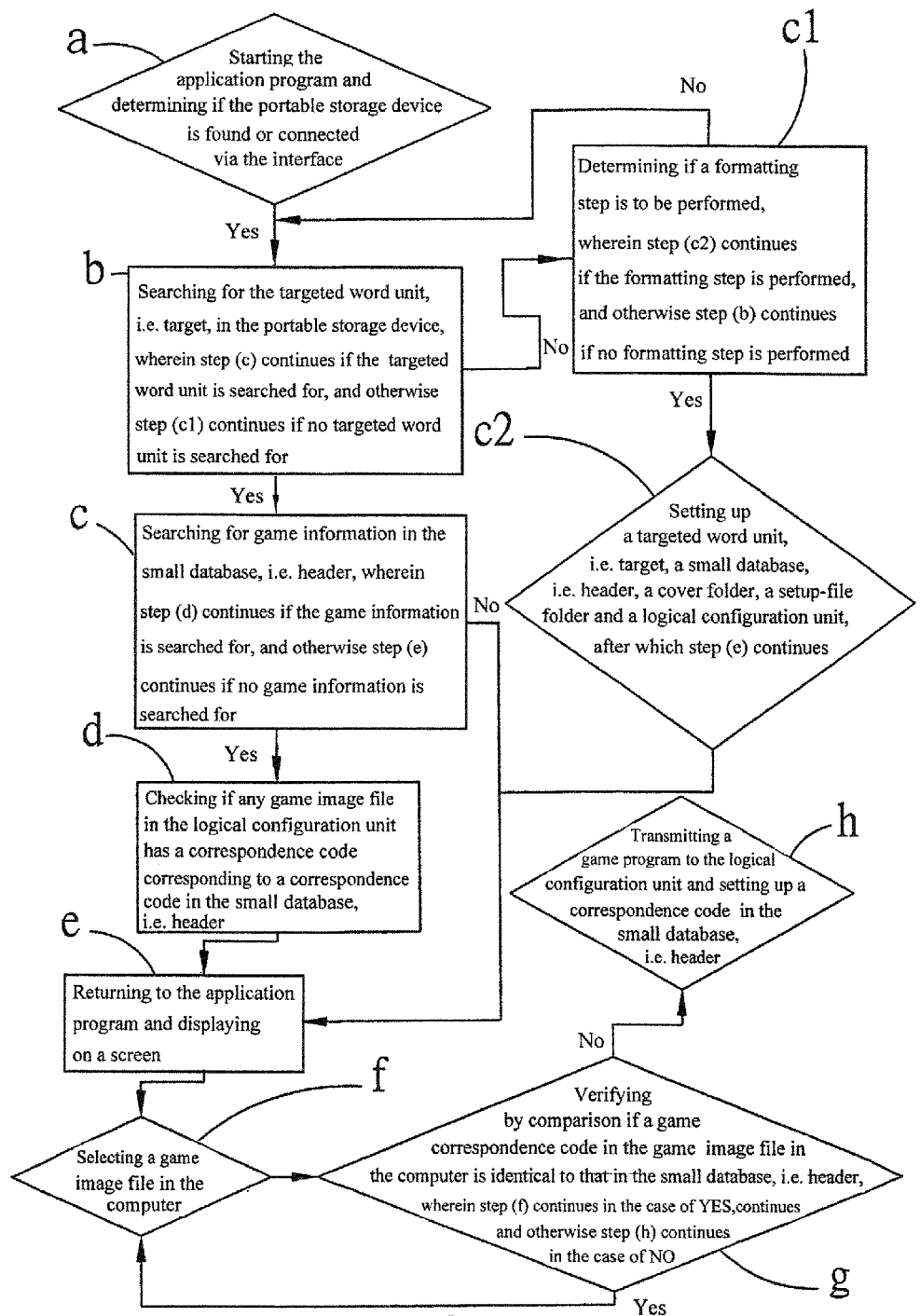
FIG. 5 is a flow chart of steps of a computer acting as the game console to transmit game files in accordance with the present invention.

FIG. 5 is a flow chart of steps of a computer acting as the game console to transmit game files in accordance with the present invention. Referring to FIG. 5, the steps include:
(a) starting the application program and determining if the portable storage device is found or connected via the interface;
(b) searching for the targeted word unit, i.e. target, in the portable storage device, wherein step (c) continues if the targeted word unit is searched for, and otherwise step (c1) continues if no targeted word unit is searched for;
(c1) determining if a formatting step is to be performed, wherein step (c2) continues if the formatting step is performed, and otherwise step (b) continues if no formatting step is performed;
(c2) setting up a targeted word unit, i.e. target, a small database, i.e. header, a cover folder, a setup-file folder and a logical configuration unit, after which step (e) continues;
(c) searching for game information in the small database, i.e. header, wherein step (d) continues if the game information is searched for, and otherwise step (e) continues if no game information is searched for;
(d) checking if any game image file in the logical configuration unit has a correspondence code corresponding to a correspondence code in the small database, i.e. header;
(e) returning to the application program and displaying on a screen;
(f) selecting a game image file in the computer;
(g) verifying by comparison if a game correspondence code in the game image file in the computer is identical to that in the small database, i.e. header, wherein step (f) continues in the case of YES, and otherwise step (h) continues in the case of NO;
(h) transmitting a game program to the logical configuration unit and setting up a correspondence code in the small database, i.e. header.

The above steps are described for more elaboration, as below:
(a) connecting the portable storage device with the computer, i.e. game console, starting the application program in the computer and determining if the portable storage device is found or connected via the interface;

(b) searching for the targeted word unit, i.e. target, in the portable storage device when the portable storage device is determined to be found by the computer, wherein step (c) continues if the targeted word unit is searched for, and otherwise step (c1) continues if no targeted word unit is searched for;

(c1) the computer asking the user if a formatting step is to be performed to the portable storage device, wherein step (c2) continues if the formatting step is performed, and otherwise step (b) continues if no formatting step is performed;

(c2) setting up a targeted word unit, i.e. target, a small database, i.e. header, a cover folder, a setup-file folder and a logical configuration unit in the portable storage device, after which step (e) continues;

(c) searching for game information in the small database, i.e. header, wherein step (d) continues if the game information is searched for, and otherwise step (e) continues if no game information is searched for;

(d) checking if any game image file in the logical configuration unit in the portable storage device has a correspondence code, i.e. game ID, corresponding to a correspondence code in the small database, i.e. header; for example, when the game image file has a correspondence code, i.e. game ID, of 02 and the small database has a correspondence code of 02, a game of the code 02 is checked to be contained;

(e) returning to the application-program menu and displaying on a screen;

(f) selecting a game image file in the computer;

(g) verifying by comparison if a game correspondence code, i.e. GAME ID, in the game image file in the computer is identical to that in the small database, i.e. header, wherein step (f) continues in the case of YES, and otherwise step (h) continues in the case of NO;

(h) transmitting the game program to the logical configuration unit, transmitting a cover picture or a setup file to the cover folder or setup-file folder in the setup-file unit and setting up a correspondence code in the small database, i.e. header.

Figure 6:
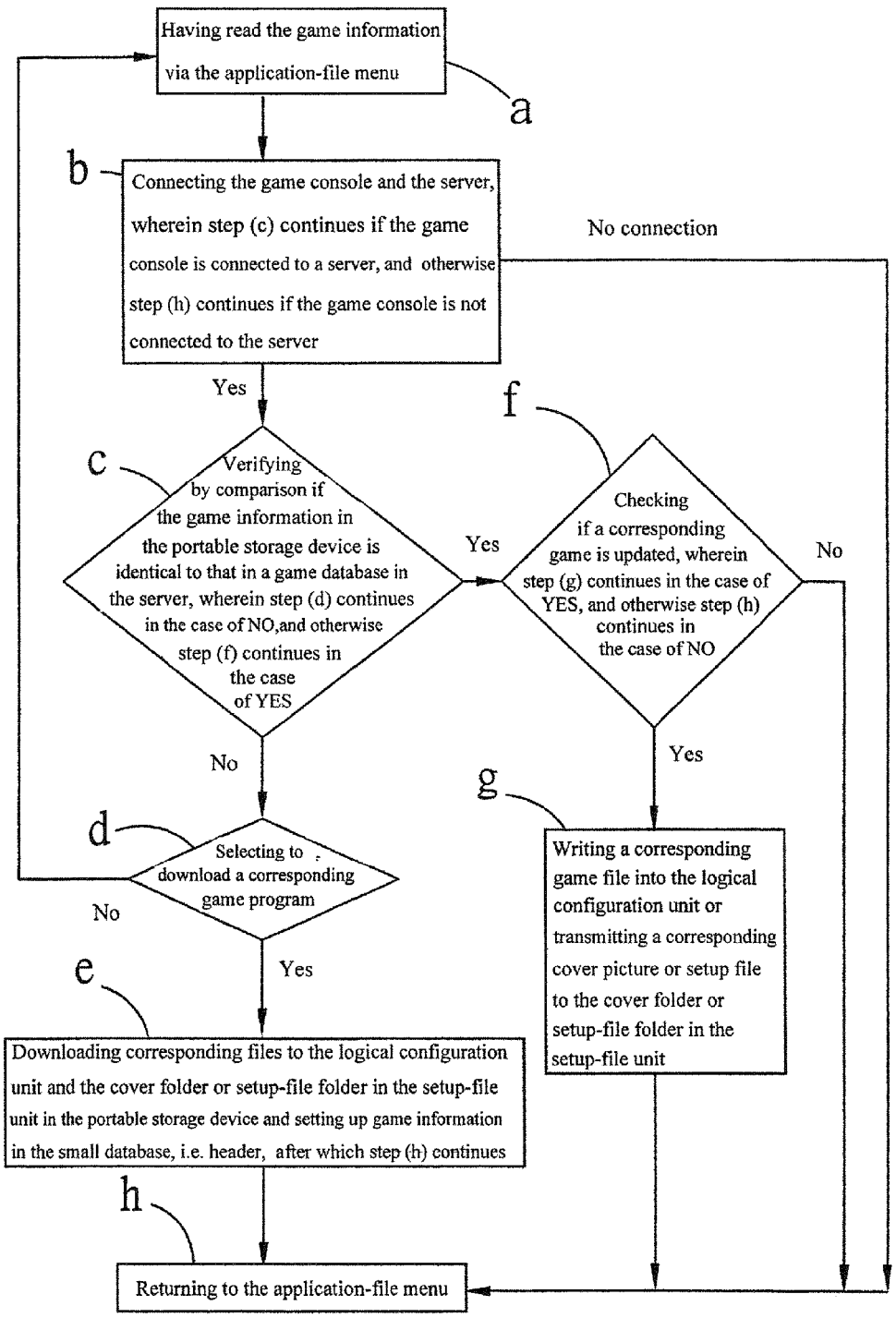
FIG. 6 is a flow chart of a downloading step performed by the game console connecting with the portable storage device and a server in accordance with the present invention.

FIG. 6 is a flow chart of a downloading step performed by the game console connecting with the portable storage device and a server in accordance with the present invention. Referring to FIG. 6, after the portable storage device is mounted on the game console and the game console finishes reading via the application-file menu, the game console can perform the following steps to connect with a server:

(a) having read the game information via the application-file menu;

(b) connecting the game console and the server, wherein step (c) continues if the game console is connected to a server, and otherwise step (h) continues if the game console is not connected to the server;

(c) verifying by comparison if the game information in the portable storage device is identical to that in a game database in the server, wherein step (d) continues in the case of NO, and otherwise step (f) continues in the case of YES;

(d) selecting to download a corresponding game program;

(e) downloading corresponding files to the logical configuration unit and the cover folder or setup-file folder in the setup-file unit in the portable storage device and setting up game information in the small database, i.e. header, after which step (h) continues;

(f) checking if a corresponding game is updated, wherein step (g) continues in the case of YES, and otherwise step (h) continues in the case of NO;

(g) writing a corresponding game file into the logical configuration unit or transmitting a corresponding cover picture or setup file to the cover folder or setup-file folder in the setup-file unit;

(h) returning to the application-file menu.

The above steps are described for more elaboration, as below:

(a) having read the game information via the application-file menu;

(b) informationally connecting the game console and the preset server via a network interface, wherein step (c) continues if the game console is connected to the server, and otherwise step (h) continues if the game console is not connected to the server;

(c) verifying by comparison if the game infoi nation in the small database in the portable storage device is identical to that in a game database in the preset server, wherein step (d) continues in the case of NO, and otherwise step (f) continues in the case of YES;

(d) selecting to download a corresponding game program;

(e) downloading a corresponding game file to the logical configuration unit in the portable storage device, transmitting a corresponding cover picture or setup file to the cover folder or setup-file folder in the setup-file unit and setting up game information including a game correspondence code in the small database, i.e. header, after which step (h) continues;

(f) checking if a corresponding game file in the server is replaced when the game information is verified to be identical, wherein step (g) continues in the case of YES, and otherwise step (h) continues in the case of NO;

(g) writing a correspondence game file into the logical configuration unit or transmitting a corresponding cover picture or setup file to the cover folder or setup-file folder in the setup-file unit;

(h) returning to the application-file menu.

In short, a user can use the application program to verify by comparison if the game information in the small database is identical to that in a game database in the server and then optionally to download updated information or to overwrite an original file.

Figure 7:
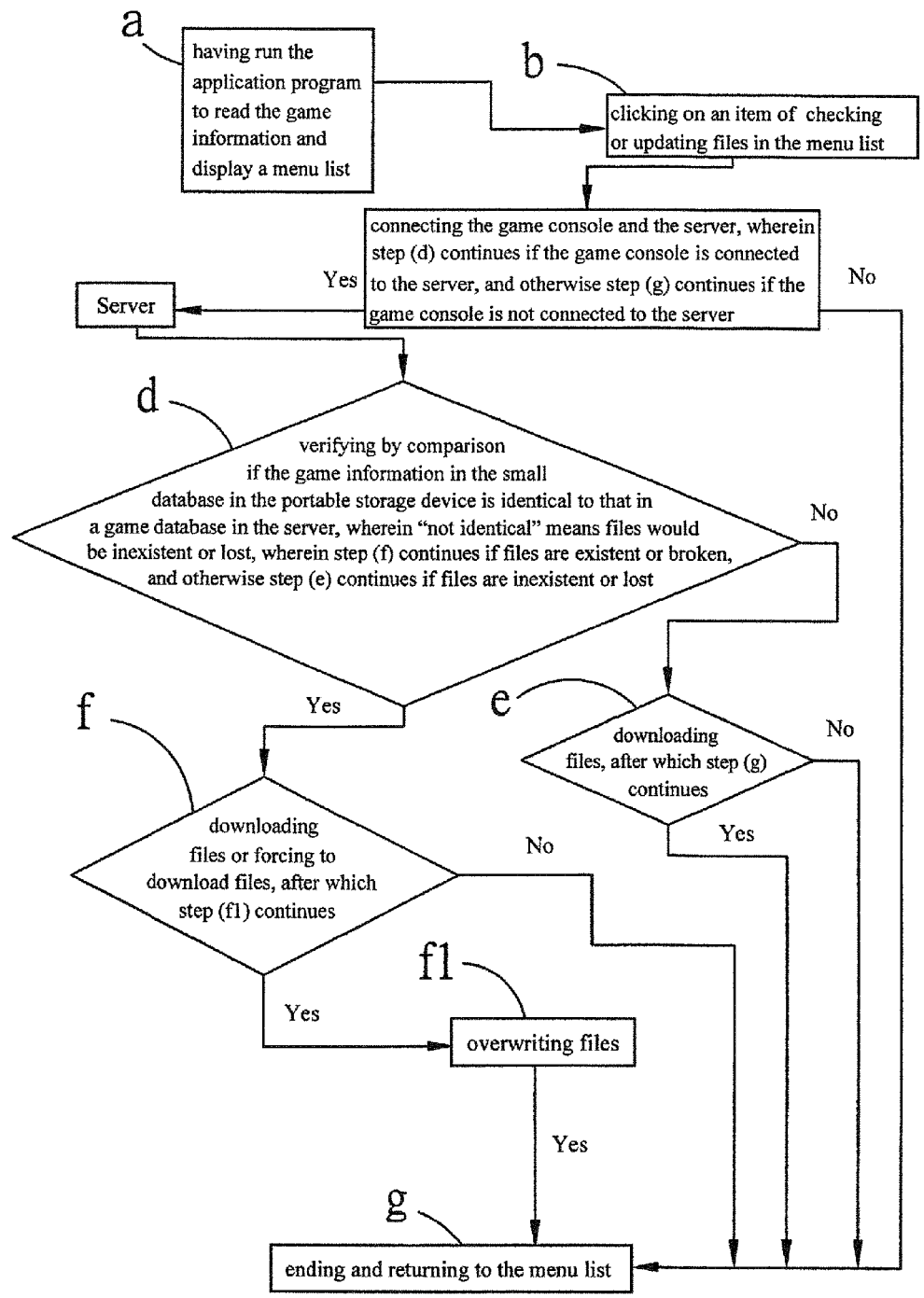
FIG. 7 is a flow chart of an information updating step to verify if current files can be normally operated or displayed, performed by the game console connecting with the portable storage device and at least a server in accordance with the present invention.

FIG. 7 is a flow chart of an information updating step to verify if current files can be normally operated or displayed, performed by the game console connecting with the portable storage device and at least a server in accordance with the present invention. Referring to FIG. 7, after the portable storage device is mounted on the game console and the game console finishes reading via the application-file menu, the game console can perform the following steps:

(a) having run the application program to read the game information and display a menu list;

(b) clicking on an item of checking or updating files in the menu list;

(c) connecting the game console and the server, wherein step (d) continues if the game console is connected to the server, and otherwise step (g) continues if the game console is not connected to the server;

(d) verifying by comparison if the game information in the small database in the portable storage device is identical to that in a game database in the server, wherein "not identical" means files would be inexistent or lost, wherein step (f) continues if files are existent or broken, and otherwise step (e) continues if files are inexistent or lost;

(e) downloading files, after which step (g) continues;
(f) downloading files or forcing to download files, after which step (f1) continues;
(f1) overwriting files;
(g) ending and returning to the menu list.

Figure 8:
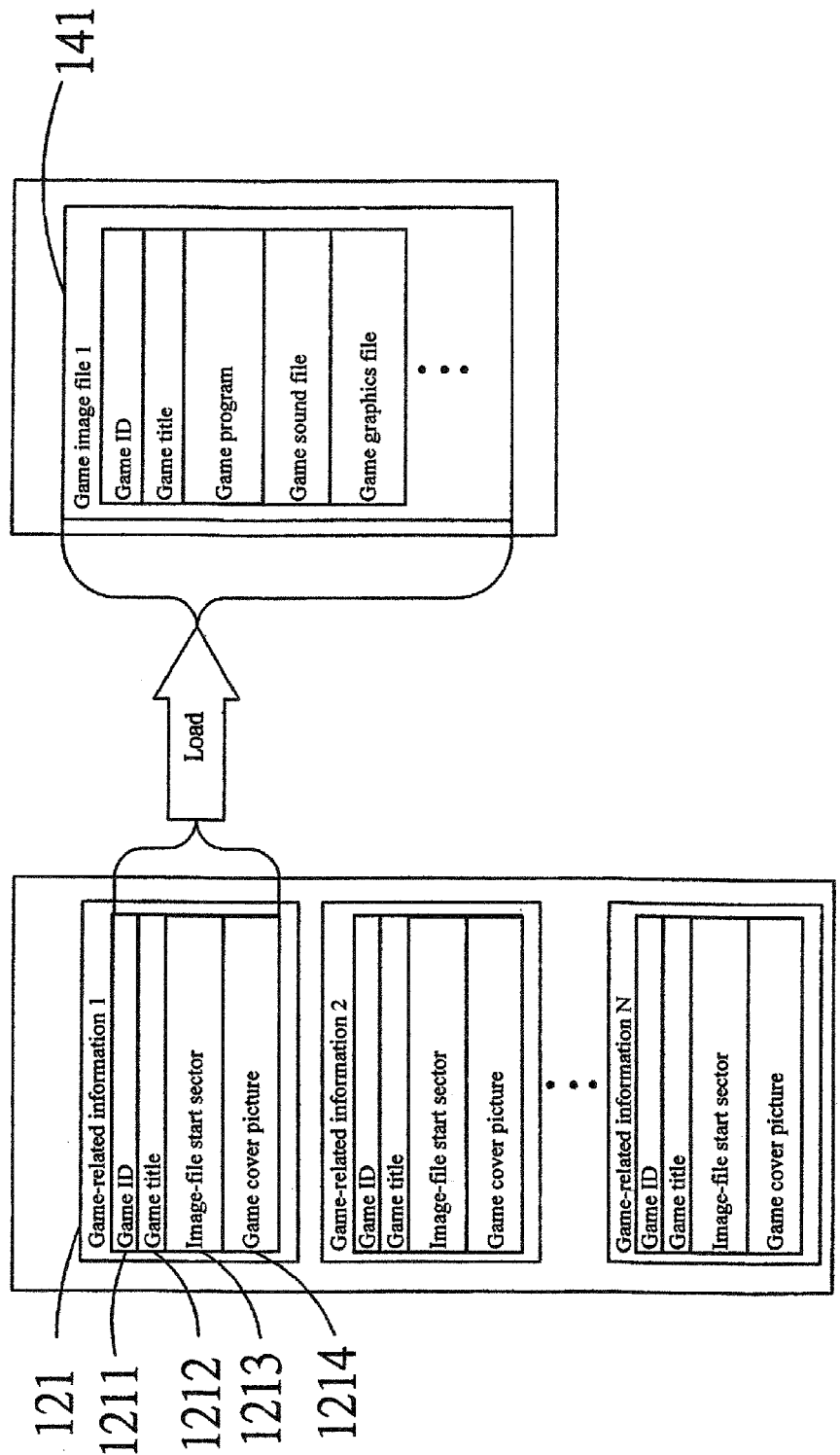
FIG. 8 is a layout of application programs in a memory in accordance with the present invention.

FIG. 8 is a layout of application programs in a memory in accordance with the present invention. The memory runs in ways described as below. Referring to FIG. 8, the application program in the memory includes game-related information 121 having the game correspondence code 1211 (GAME ID), a game title 1212, an image-file start sector 1213 and a game cover picture 1214; when a user select a game via the application-program menu, the game image file 141, having the correspondence code (GAME ID) identical to the correspondence code (GAME ID) of the game-related information 121, in the logical configuration unit can be read. The game image file 141 including a game correspondence code, game title, game (main) program and game video file (game sound file and game graphics file) can be loaded in the free space of the memory to provide a user to play a game. Unselected game related information 121 has program not to be processed. Thereby, the advantages of nonsynchronous localization can be achieved.

Figure 9:
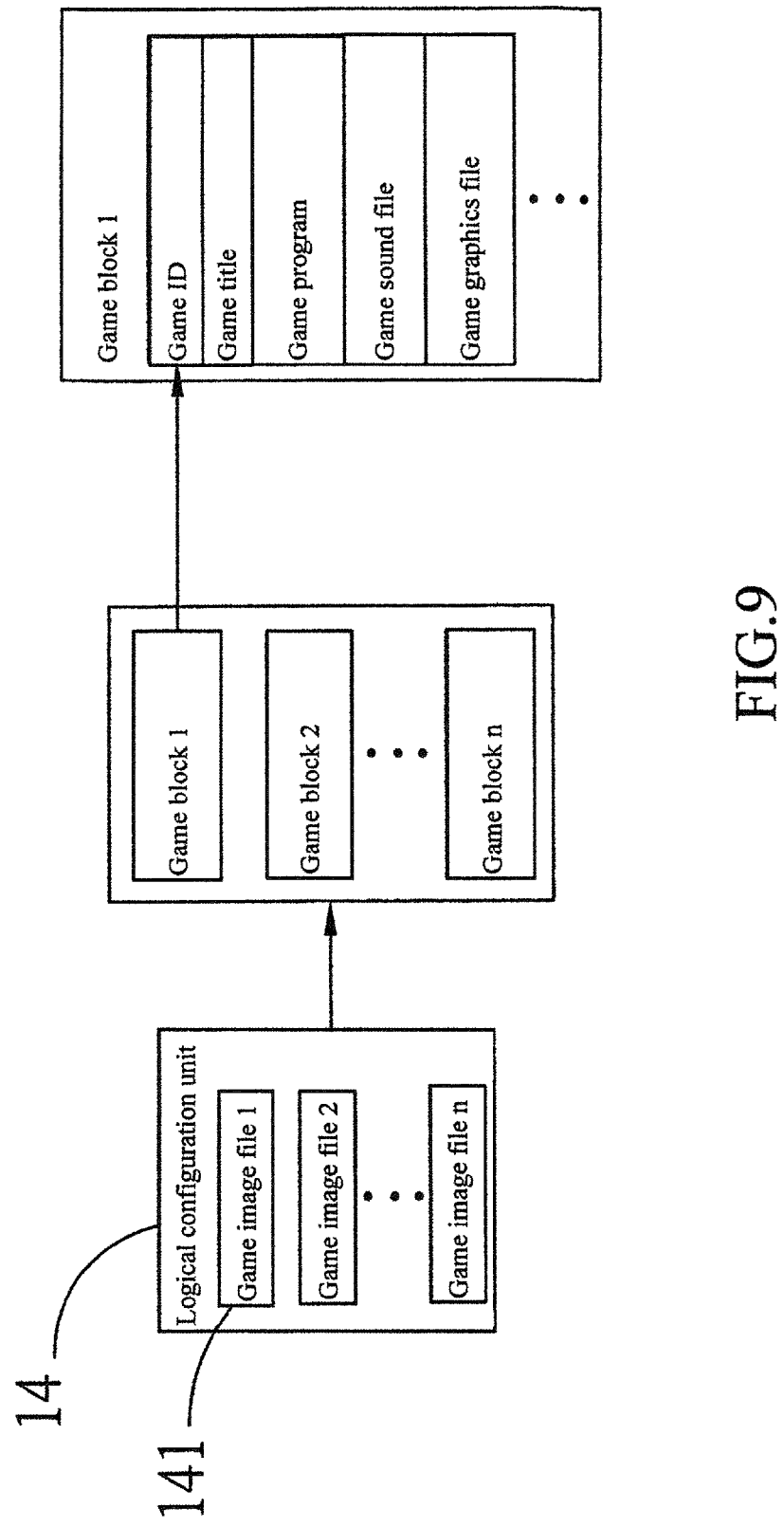
FIG. 9 is a first schematic structural view of expanding the game file, which can be seen in the hot-pluggable portable storage device, in accordance with the present invention.
Figure 10:
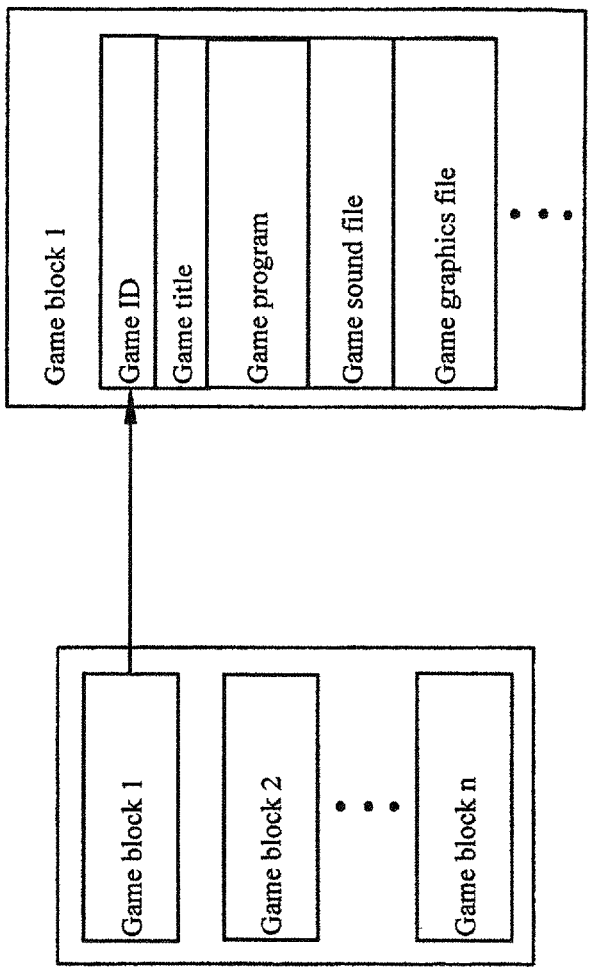
FIG. 10 is a second schematic structural view of expanding the game file, which seems to be seen in a view from the game console, in accordance with the present invention.

FIG. 9 is a first schematic structural view of expanding the game file in accordance with the present invention. FIG. 10 is a second schematic structural view of expanding the game file in accordance with the present invention. Referring to FIG. 9, in a view from a storage medium, a plurality of the game image file 141 is in the logical configuration unit 141. Each of the game image files 141 is a package that can be released into a game block or folder. When the game image files 141 are clicked to be released, each of the game blocks or folders includes a game correspondence code (GAME ID), game title, game (main) program, game sound data or file and game graphics data or file. Referring to FIG. 10, in a view from a game console, multiple game folders or blocks seem to be seen. In the game folders or blocks are game correspondence codes, game titles, game (main) programs, game sound data or files and game graphics data or files.

Accordingly, in accordance with the present invention, a localization technology of mounting a game, in a portable storage device, on a game console can improve traditional technologies, mentioned as below:

A game can be promptly mounted using the nonsynchronous localization technology to simulate the portable storage device as an internal hard disk in the game console. Thereby, effectiveness can be enhanced. The game console has a reduced volume and can have a game promptly mounted thereon without any hard disk. In the other words, the portable storage device can be preset as a hard disk in the game console so as to perform the nonsynchronous localization technology.

Besides, the indefinite number of the portable storage devices can be promptly mounted.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A method of mounting a game, for a localization system comprising a portable storage device and a game console, the method comprising steps of:
    (a) starting an application program set in a storage unit in the game console via an application-program menu;
    (b) running the application program to determine if the portable storage device is found or connected via an interface of the game console, wherein step (c) continues in the case of YES, and otherwise step (g) continues in the case of NO;
    (c) searching for a targeted word unit, in the portable storage device;
    (d) searching for game information in a small database of the portable storage device when the targeted word unit is searched;
    (e) checking if any cover information or setup-file information has correspondence to a correspondence code in the small database when the game information is searched;
    (f) reading a setup-file unit, corresponding to the correspondence code in the small database, including cover information or setup-file information when cover information or setup-file information has correspondence to the correspondence code in the small database, after which step (g) continues; and
    (g) returning to the application-program menu and displaying on a screen;
    wherein the game console comprises a central processing unit (CPU) to load a game image file in a main memory of the game console and to perform the game.

2. The method of claim 1, further comprises:
    (c1) performing a formatting step when no targeted word unit is searched, wherein step (c2) continues after performing the formatting step, and otherwise step (g) continues if no formatting step is performed;
    (c2) setting up a targeted word unit, after which step (g) continues;
    (g1) step (g) continuing when no game information is searched; and
    (g2) step (g) continuing and employing a preset value when no cover information or setup-file information has correspondence to the correspondence code in the small database.

3. A localization system for mounting a game, comprising:
    a portable storage device comprising a targeted word unit informationally connected with a small database having a correspondence code, wherein the small database is configured to read a logical configuration unit containing at least a game image file, wherein the game image file has a correspondence code corresponding to the correspondence code in the small database so as to be precisely read by the small database; and
    a game console comprising an interface configured to informationally connect with the portable storage device, wherein information is configured to be downloaded or downloaded to overwrite an original file via the interface informationally connected with a storage unit, wherein the storage unit has an application program that can be run to read the corresponding code, having correspondence to the game image file, in the small database, to perform a display function, wherein when a user uses a controller to click on a game to be performed, by processing of a central processing unit (CPU), the game image file is loaded in a free space in a main memory and the game is performed;

wherein a downloading step performed by the game console comprises:
- (a) having read game information via an application-file menu;
- (b) connecting the game console and the server;
- (c) verifying by comparison if the game information in the portable storage device is identical to game information in the server when the game console is connected to the server;
- (f) checking if a corresponding game is updated when the game information in the portable storage device is identical to the game information in the server;
- (g) writing a corresponding game file into the logical configuration unit or transmitting a corresponding cover picture or setup file to a cover folder or setup-file folder in the portable storage device when the corresponding game is updated; and
- (h) returning to the application-file menu.

4. The localization system of claim 3, wherein the interface is configured to informationally connect with the server so as to download information or download information to overwrite an original file.

5. The localization system of claim 3, wherein the small database is informationally connected with a setup-file unit comprising the cover folder or the setup-file folder.

6. The localization system of claim 5, wherein the downloading step further comprises:
- (d) selecting to download a game program when the game information in the portable storage device is not identical to the game information in the server;
- (e) downloading files to the logical configuration unit, the cover folder or setup-file folder in the setup-file unit in the portable storage device or setting up game information in the small database, after which step (h) continues; and
- (h1) step (h) continuing when the corresponding game is not updated.

7. The localization system of claim 3, wherein in the game image file are a game correspondence code, game name, game main program and game video file.

8. The localization system of claim 3, wherein the game console comprises a computer, XBOX, XBOX 360, PS 2, PS3, WII, N64 or any type of game console connectable to a television, the portable storage device comprises a MMC card, SD card, MINI card, MD card, FLASH memory, hard disk or any type of portable storage device for storing a game file, and the interface comprises a USB port, RS-454 port, IEEE 1394 port or SATA port.

9. The localization system of claim 8, wherein a method for transmitting the game file to the game console, in the case of a computer comprises:
- (a) starting the application program and determining if the portable storage device is found or connected via the interface;
- (b) searching for a targeted word unit in the portable storage device, wherein step (c) continues if the targeted word unit is searched for, and otherwise step (c1) continues if no targeted word unit is searched for;
- (c1) determining if a formatting step is to be performed, wherein step (c2) continues if the formatting step is performed, and otherwise step (b) continues if no formatting step is performed;
- (c2) setting up a targeted word unit after which step (e) continues;
- (c) searching for game information in the small database, wherein step (d) continues if the game information is searched for, and otherwise step (e) continues if no game information is searched for;
- (d) checking if any game image file in the logical configuration unit has a correspondence code corresponding to a correspondence code in the small database;
- (e) returning to the application program and displaying on a screen;
- (f) selecting a game image file in the computer;
- (g) verifying by comparison if a game correspondence code in the game image file in the computer is identical to that in the small database, wherein step (f) continues in the case of YES, and otherwise step (h) continues in the case of NO; and
- (h) transmitting a game program to the logical configuration unit and setting up a correspondence code in the small database.

10. The localization system of claim 3, wherein the game console further comprises an optical-disk storage medium readable by an optical-disk apparatus, wherein in the optical-disk storage medium is at least a game file, wherein the optical-disk apparatus can read the optical-disk storage medium to write the game file into the logical configuration unit.

11. The localization system of claim 3, wherein an information updating step to verify if current files can be normally operated or displayed, performed by the game console connecting with the portable storage device and at least a server, comprises:
- (a) having run an application program to read game information and display a menu list;
- (b) clicking on an item of checking or updating files in the menu list;
- (c) connecting the game console and the server, wherein step (d) continues if the game console is connected to the server, and otherwise step (g) continues if the game console is not connected to the server;
- (d) verifying by comparison if the game information in the small database in the portable storage device is identical to that in a game database in the server, wherein "not identical" means files would be inexistent or lost, wherein step (f) continues if files are existent or broken, and otherwise step (e) continues if files are inexistent or lost;
- (e) downloading files, after which step (g) continues;
- (f) downloading files or forcing to download files, after which step (f1) continues;
- (f1) overwriting files; and
- (g) ending and returning to the menu list.

12. A downloading method, performed by a game console connected to a portable storage device, the downloading method comprising steps of:
having read game information via an application-file menu;
verifying by comparison if the game information in the portable storage device is identical to game information in a server when the game console is connected to the server;
checking if a corresponding game is updated when the game information in the portable storage device is identical to the game information in the server; and
writing a corresponding game file into a logical configuration unit of the portable storage device or transmitting a corresponding cover picture or setup file to a cover folder or setup-file folder in a setup-file unit of the portable storage device when the corresponding game is updated.

13. The downloading method of claim 12, further comprising:
selecting to download a game program when the game information in the portable storage device is not identical to the game information in the server;
downloading files to the logical configuration unit, the cover folder or setup-file folder in the setup-file unit of the portable storage device or setting up game information in a small database of the portable storage device; and
returning to the application-file menu.

14. The downloading method of claim 12, further comprising returning to the application-file menu when the corresponding game is not updated.

15. The downloading method of claim 12, wherein in the game image file are a game correspondence code, game name, game main program and game video file.

* * * * *